United States Patent
Salla et al.

(10) Patent No.: US 10,344,200 B2
(45) Date of Patent: Jul. 9, 2019

(54) DOWNHOLE RESIN COATINGS COMPRISING A CARBON NANOMATERIAL AND METHODS ASSOCIATED THEREWITH

(71) Applicant: Halliburton Energy Services, Inc., Houston, TX (US)

(72) Inventors: Rajender Salla, Pune (IN); Neelam Deepak Raysoni, Pune (IN); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/516,379

(22) PCT Filed: Nov. 4, 2014

(86) PCT No.: PCT/US2014/063887
§ 371 (c)(1),
(2) Date: Mar. 31, 2017

(87) PCT Pub. No.: WO2016/072977
PCT Pub. Date: May 12, 2016

(65) Prior Publication Data
US 2017/0327729 A1 Nov. 16, 2017

(51) Int. Cl.
*E21B 43/02* (2006.01)
*C09K 8/575* (2006.01)
(Continued)

(52) U.S. Cl.
CPC ............ *C09K 8/5751* (2013.01); *C09K 8/565* (2013.01); *C09K 8/64* (2013.01); *C09K 8/68* (2013.01);
(Continued)

(58) Field of Classification Search
None
See application file for complete search history.

(56) References Cited

U.S. PATENT DOCUMENTS

| 7,999,027 B2 | 8/2011 | Zhamu et al. |
| 8,722,784 B2 | 5/2014 | Chakraborty et al. |
| (Continued) | | |

FOREIGN PATENT DOCUMENTS

WO  2014154577 A1  10/2014

OTHER PUBLICATIONS

Balandin, Alexander A., et al., "Superior Thermal Conductivity of Single-Layer Graphene," Nano Letters, vol. 8, No. 3, pp. 902-907, American Chemical Society, 2008.

(Continued)

*Primary Examiner* — Andrew Sue-Ako
(74) *Attorney, Agent, or Firm* — McGuireWoods LLP

(57) ABSTRACT

Resin coatings are frequently formed in conjunction with performing a subterranean treatment operation. However, poor thermal conductivity and mechanical strength of resin coatings can be problematic in a downhole environment and eventually lead to their breakdown. Methods for enhancing a resin coating in a downhole environment can comprise: introducing a treatment fluid comprising a curable resin and a carbon nanomaterial into a wellbore penetrating a subterranean formation; forming a coating of the curable resin on a surface in the wellbore, the carbon nanomaterial being dispersed throughout the coating; and curing the curable resin to form a cured resin coating.

18 Claims, 1 Drawing Sheet

(51) Int. Cl.
E21B 33/138 (2006.01)
E21B 43/00 (2006.01)
C09K 8/565 (2006.01)
C09K 8/64 (2006.01)
C09K 8/68 (2006.01)
C09K 8/88 (2006.01)

(52) U.S. Cl.
CPC .............. *C09K 8/88* (2013.01); *E21B 33/138* (2013.01); *E21B 43/00* (2013.01); *E21B 43/025* (2013.01); *C09K 2208/10* (2013.01)

(56) References Cited

U.S. PATENT DOCUMENTS

| | | | |
|---|---|---|---|
| 2005/0274510 A1* | 12/2005 | Nguyen | C09K 8/805 166/250.12 |
| 2007/0079965 A1 | 4/2007 | Nguyen et al. | |
| 2008/0133193 A1* | 6/2008 | Gdanski | E21B 43/26 703/10 |
| 2012/0227967 A1 | 9/2012 | Shaikh et al. | |
| 2012/0302668 A1 | 11/2012 | Choi et al. | |
| 2013/0072613 A1 | 3/2013 | Miltner et al. | |
| 2013/0192835 A1* | 8/2013 | Vorderbruggen | E21B 43/04 166/305.1 |
| 2014/0027116 A1 | 1/2014 | Suresh et al. | |
| 2014/0110101 A1 | 4/2014 | Craster et al. | |
| 2017/0247608 A1* | 8/2017 | Raysoni | C09K 8/805 |

OTHER PUBLICATIONS

Choi, Eun-Young, et al., "Noncovalent functionalization of graphene with end-functional polymers," Journal of Materials Chemistry, vol. 20, pp. 1907-1912, 2010.

Georgakilas, Vasilios, et al. "Functionalization of Graphene: Covalent and Non-Covalent Approaches, Derivatives and Applications, Chemical Reviews," vol. 112, No. 11, pp. 6156-6214, 2012.

Lee, Changgu, et al., "Measurement of the Elastic Properties and Intrinsic Strength of Monolayer Graphene," Science, vol. 321, pp. 385-388, Jul. 18, 2008.

Mak, Kin Fai, et al., "Optical spectroscopy of graphene: From the far infrared to the ultraviolet," Solid State Communications, vol. 152, pp. 1341-1349, 2012.

Steurer, Peter, et al., "Functionalized Graphenes and Thermoplastic Nanocomposites Based upon Expanded Graphite Oxide," Macromolecular Rapid Communications, vol. 30, pp. 316-327, 2009.

International Search Report and Written Opinion dated Jul. 14, 2015 in PCT Application No. PCT/US2014/063887.

* cited by examiner

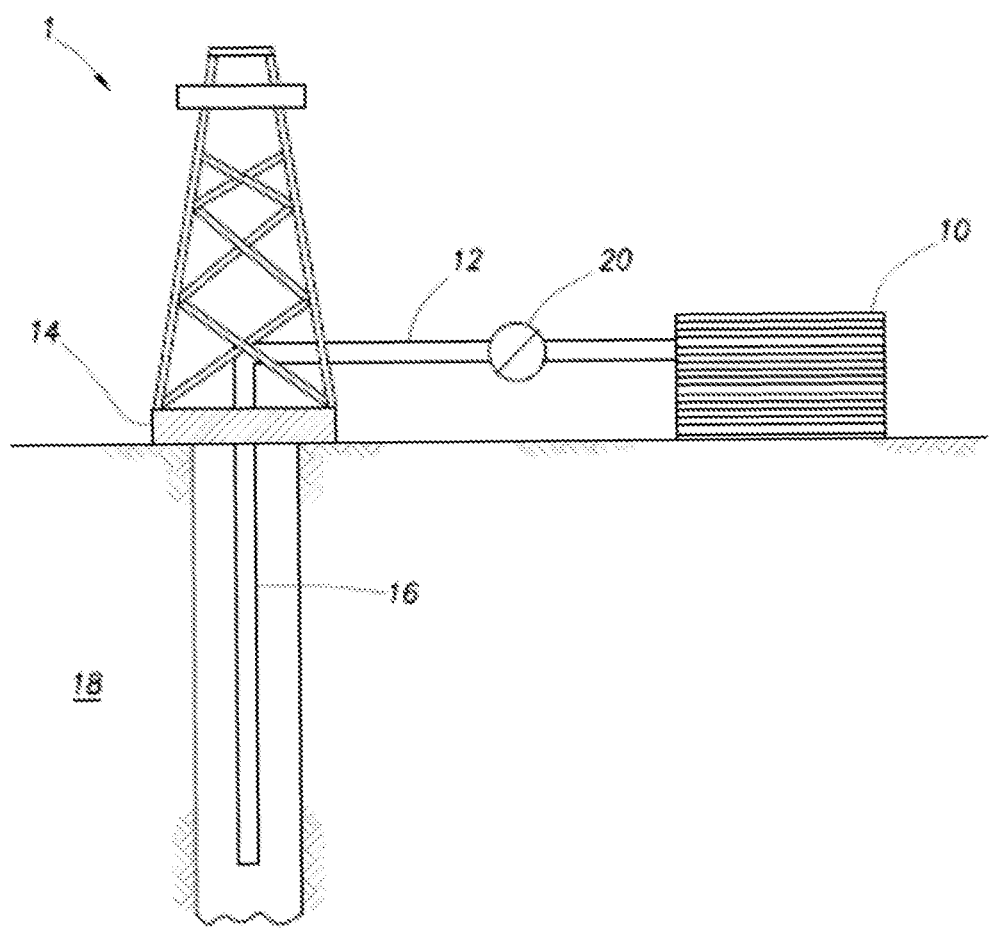

DOWNHOLE RESIN COATINGS COMPRISING A CARBON NANOMATERIAL AND METHODS ASSOCIATED THEREWITH

BACKGROUND

The present disclosure generally relates to subterranean treatment operations, and, more specifically, to methods for enhancing a resin coating formed in conjunction with a subterranean treatment operation.

Treatment fluids can be used in a variety of subterranean treatment operations. Such treatment operations can include, without limitation, drilling operations, stimulation operations, production operations, remediation operations, sand control operations, and the like. As used herein, the terms "treat," "treatment," "treating," and grammatical equivalents thereof will refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like. Such treatment operations are conducted in a wellbore penetrating a subterranean formation. As used herein, the term "wellbore" will refer to a borehole drilled in a subterranean formation.

A downhole coating can be formed in conjunction with a number of treatment operations. Illustrative treatment operations in which downhole coatings are formed in a wellbore include, for example, consolidation operations, fines control operations, sand control operations, proppant or gravel pack stabilization operations, and the like. Depending on the intended nature of the treatment operation, a downhole coating can be configured for either temporary or permanent deployment in the wellbore. As used herein, the term "in the wellbore" will refer to any one or more of the following: the borehole defining the wellbore, the subterranean formation surrounding the wellbore, or a portion of the subterranean formation adjacent to propped fractures.

Substantially non-degradable resins are frequently used for deploying a downhole coating in a permanent configuration within a wellbore. However, even resin coatings configured for permanent deployment gradually degrade upon exposure to the harsh conditions present in the downhole environment. For example, continuous exposure of the resin coating to water vapor and high downhole temperatures and pressures can lead to crack formation and propagation. The cracks can lead to eventual failure of the resin coating. Failure of a resin coating can negatively impact a well's lifetime and production capacity. Expensive and time-consuming workover and remedial operations may be needed to address the failure of a resin coating.

Without being bound by any theory or mechanism, it is believed that the failure of resin coatings often occurs in the downhole environment due to the low mechanical strength and poor thermal conductivity of many unmodified resins. Although the mechanical strength of resins can often be improved with reinforcing materials, such as reinforcing fibers (e.g., fiberglass), most of these reinforcing materials do not enhance thermal conductivity values to any significant degree. Similarly, many thermal conductivity enhancers do little to improve the mechanical strength of resins. Of most significance, many conventional materials for enhancing mechanical strength or thermal conductivity can be difficult to effectively introduce into a downhole environment. For example, reinforcing fibers or thermal conductivity enhancers can often be problematic to pump and can negatively impact the properties of a treatment fluid used to introduce the resin into a wellbore. High loadings of reinforcing materials or thermal conductivity enhancers may be particularly problematic in this regard. High resin contents can upset the fine balance between conveying mechanical strength to a proppant pack while maintaining its conductivity.

BRIEF DESCRIPTION OF THE DRAWING

The following FIGURE is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location, according to one or more embodiments.

DETAILED DESCRIPTION

The present disclosure generally relates to subterranean treatment operations, and, more specifically, to methods for enhancing a resin coating formed in conjunction with a subterranean treatment operation.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, resin coatings often lack sufficient resiliency for extended deployment in a wellbore. Specifically, unmodified resin coatings can lack sufficient mechanical strength and thermal conductivity to limit their degradation in the downhole environment. Although some conventional additives can be used to individually enhance one of these factors, it can often be difficult to simultaneously enhance both with a single type of additive. Moreover, many conventional reinforcing materials or thermal conductivity enhancers can be unsuitable for introduction into a wellbore in a treatment fluid, particularly at high loading concentrations.

The present inventors discovered that carbon nanomaterials may be included as an additive in a downhole resin coating to simultaneously improve the resin coating's mechanical strength and thermal conductivity. Simultaneously improving both of these factors may decrease the propensity of the resin coating to undergo crack formation and propagation. As used herein, the term "carbon nanomaterial" will refer to a structure that comprises substantially carbon (i.e., >99% carbon atoms by atomic percentage) and is of nanoscale size in at least one dimension. As used herein, the term "nanoscale size" will refer to a size of about 100 nm or less. Illustrative carbon nanomaterials that can be suitable for conveying both mechanical strength and thermal conductivity to a resin coating include carbon nanotubes and graphene, as well as various derivatives and forms thereof. Particularly suitable forms of graphene are discussed hereinafter.

In addition to their inherent mechanical strength and thermal conductivity, carbon nanomaterials also provide a number of other advantages that readily promote their use in a downhole environment. The small size of carbon nanomaterials and their ability to impart mechanical strength and thermal conductivity enhancement to a resin coating at low loading values promotes their introduction to a subterranean formation in a treatment fluid. Due to the small size of carbon nanomaterials and the low carbon nanomaterial loading needed for effective enhancement of a resin coating, a treatment fluid's properties can be minimally affected by the presence of the carbon nanomaterial. Carbon nanomaterials also possess a high degree of chemical stability and can be well suited for tolerating the harsh conditions of a downhole environment. Further, both carbon nanotubes and graphene may be chemically modified to further tailor the properties of a resin coating in a desired manner.

Carbon nanomaterials are compatible with a wide range of resin materials and can undergo ready dispersion in the component(s) of an uncured resin, also referred to herein as a "curable resin." The carbon nanomaterials may be dispersed in the uncured resin components in a bonded state or in a non-bonded state. For example, a carbon nanomaterial can be covalently bonded to an uncured resin component such that the carbon nanomaterial remains covalently bound to a cured resin coating formed therefrom. The carbon nanomaterial can advantageously bear intrinsic functional groups or undergo further functionalization, which can improve its dispersibility in the uncured resin components and/or promote covalent bonding thereto. Regardless of how the carbon nanomaterial is dispersed in the resin coating following curing, the carbon nanomaterial can convey enhanced mechanical strength and thermal conductivity to the cured resin coating. Enhancement of the cured resin coating may advantageously allow less resin to be used in the coating while still achieving sufficient consolidation. In addition, enhancement of the cured resin coating can mitigate the effects of stress cycling in a particulate pack.

In general, the chemistry of the carbon nanomaterial and the uncured resin components may be tailored in order to provide a desired set of properties in the cured resin coating for a particular deployment situation. For example, the chemistry of the carbon nanomaterial and the uncured resin components may be tailored to promote a desired rate of curing and/or a desired degree of temperature resistance in a subterranean formation. In addition, the functionality of the carbon nanomaterial and/or the uncured resin components may be chosen to promote covalent bond formation to the carbon nanomaterial in the cured resin coating, if desired.

In addition to enhancing the properties of a cured resin coating, the present inventors also recognized that the carbon nanomaterials may also be used to indirectly monitor the resin coating's downhole integrity. Carbon nanomaterials are extremely sensitive toward spectroscopic detection. Illustrative spectroscopic techniques that may be used for monitoring both carbon nanotubes and graphene include infrared, ultraviolet, and Raman spectroscopies. Fluorescence spectroscopy can also be used to detect certain types of carbon nanotubes (e.g., semiconducting carbon nanotubes) in extremely low concentrations. Accordingly, the present inventors recognized that by spectroscopically monitoring a fluid produced from a subterranean formation containing a carbon nanomaterial-enhanced resin coating, the integrity of the cured resin coating may be indirectly inferred. Specifically, a lack of carbon nanomaterial production from the subterranean formation may allow one to infer that the cured resin coating remains intact. However, if the carbon nanomaterial or a derivative thereof is detected in the produced fluid, it may be inferred that the cured resin coating has undergone at least partial degradation to release the carbon nanomaterial (in free form or encased in resin pieces). Detection of a carbon nanomaterial derivative differing from the carbon nanomaterial initially present in the cured resin coating can also be indicative of chemical incompatibility with the wellbore conditions. In either case, the detection of a produced carbon nanomaterial may serve as a trigger for performing a workover or remedial operation in the wellbore.

Although carbon nanotubes and graphene may both be suitable carbon nanomaterials for practicing the various embodiments of the present disclosure, graphene may be somewhat more advantageous for bulk applications in the oilfield. Synthesis costs for carbon nanotubes are rapidly decreasing due to the implementation of new experimental techniques, but these entities remain relatively expensive for high volume applications. In contrast, various forms of graphene are available relatively inexpensively from a number of sources. Illustrative graphene production techniques and graphene forms are discussed in more detail below. Graphene also possesses extensive intrinsic oxygenated functional groups (e.g., carboxylic acids, carbonyls, alcohols and epoxides) around the periphery of the graphene sheet or at defect sites within the interior of the graphene sheet. These intrinsic functional groups may be used to promote covalent bond formation to a cured resin coating, as indicated above. Regardless of their location, the intrinsic functional groups of graphene can provide a further advantage over carbon nanotubes, which either lack intrinsic functionality or have a much lower functional group density As used herein, the terms "graphene" or "graphene sheet" will refer to a single-layer two-dimensional $sp^2$ carbon sheet or a few-layer structure comprising about 20 or less two-dimensional $sp^2$ carbon sheets that are stacked upon one another. Unless otherwise specified herein, use of these terms in the present disclosure will refer to either a single-layer or a few-layer structure. A plurality of graphene sheets comprises bulk graphite when stacked upon one another. Whereas bulk graphite has rather poor mechanical properties, graphene has an extremely high mechanical strength, as indicated above. For purposes of this disclosure, bulk graphite will be considered to constitute about 20 or more graphene sheets stacked upon one another.

In some embodiments, methods described herein may comprise: introducing a treatment fluid comprising a curable resin and a carbon nanomaterial into a wellbore penetrating a subterranean formation; forming a coating of the curable resin on a surface in the wellbore, the carbon nanomaterial being dispersed throughout the coating; and curing the curable resin to form a cured resin coating. The cured resin coating may be formed within the wellbore itself or in the subterranean formation surrounding the wellbore according to the embodiments described herein. In more specific embodiments, the carbon nanomaterial may comprise a graphene material.

Treatment fluids used in the methods described herein may comprise any suitable carrier fluid. In some embodiments, suitable carrier fluids may include, for example, an aqueous carrier fluid. Suitable aqueous carrier fluids may include, for example, fresh water, saltwater (e.g., water containing one or more salts dissolved therein), brine (e.g., saturated salt water), seawater, produced water, or any combination thereof. Other aqueous carrier fluids are also possible, and the aqueous carrier fluid may generally be obtained from any source that does not provide components that may adversely affect a treatment operation being conducted in the subterranean formation. Similarly, the aqueous carrier fluid may be chosen from any source that does not provide components that may interfere with the curing process to form a cured resin coating. One having ordinary skill in the art and the benefit of the present disclosure will be able to choose a suitable aqueous carrier fluid and amount thereof for use in conjunction with a particular treatment operation and curable resin.

In some embodiments, an aqueous-miscible organic solvent may be present as a co-solvent in an aqueous carrier fluid. Suitable co-solvents that may be present in an aqueous carrier fluid include, but are not limited to, glycols and alcohol solvents, for example. When present, the amount of the co-solvent may range between about 1% to about 50% by volume of the treatment fluid. Non-aqueous miscible co-solvents, such as plant oils, may be used in some embodiments.

Similarly, in other embodiments, a non-aqueous carrier fluid, such as a hydrocarbon-based carrier fluid, may be used to introduce the curable resin and the carbon nanomaterial into the wellbore. Again, the choice of a suitable non-aqueous carrier fluid and the amount thereof may be made by one having ordinary skill in the art and the benefit of the present disclosure.

Surfaces that may be covered or contacted by the cured resin coating in the wellbore are not considered to be particularly limited. In specific embodiments, illustrative surfaces in the wellbore that may be coated with the cured resin coating include proppant particulates, gravel particulates, unconsolidated sand, a fracture face of the subterranean formation, formation sand, formation fines, any combination thereof, and the like. Accordingly, in various embodiments, the treatment fluid may be introduced to the subterranean formation during a fracturing operation, a gravel packing operation, a frac-packing operation, a consolidation operation, a sand control operation, a fines control operation, or any combination thereof.

In some embodiments, the treatment fluid comprising the curable resin and the carbon nanomaterial may form a coating of the curable resin upon reaching an intended surface in the wellbore. That is, in some embodiments, a cured resin coating may be formed on an existing surface within the wellbore. For example, in some embodiments, a cured resin coating may be formed upon a fracture face of the subterranean formation or upon particulates that are already present in the subterranean formation.

When forming a cured resin coating upon a fracture face of the subterranean formation, a pad fluid containing the curable resin and carbon nanomaterial may precede the main fracturing fluid and form a cured resin coating on the fracture face before fracture creation or extension takes place. As used herein, the term "pad fluid" will refer to a volume of proppant-free treatment fluid that is introduced to a subterranean formation in advance of a proppant-loaded fracturing fluid during a fracturing operation. Other than lacking proppant particulates, the pad fluid can have the same composition or a different composition than the main fracturing fluid. Forming a cured resin coating upon the fracture face may decrease the likelihood that formation sand or fines invade a proppant pack once it has been formed. Similar benefits may also be realized during consolidation or sand control operations, such as during stand-alone screen completions.

In some embodiments, the methods can further comprise introducing a fracturing fluid to the subterranean formation following the pad fluid. During a fracturing operation, the pad fluid and the fracturing fluid are introduced into the wellbore at or above the fracture gradient pressure of the subterranean formation. The pad fluid and the fracturing fluid can create or extend or more fractures in the subterranean formation. Proppant particulates from the fracturing fluid may then be disposed in the one or more fractures.

In some embodiments, a cured resin coating may be formed upon particulates that are already present within the wellbore. For example, in some embodiments, a cured resin coating may be formed upon unconsolidated sand within the subterranean formation (e.g., during a sand control operation) or upon formation fines (e.g., during a fines control operation). In some or other embodiments, a cured resin coating may be formed upon a particulate pack that is present in a wellbore, such as a gravel pack or a proppant pack. Specifically, in some embodiments, forming a coating of the curable resin may take place on proppant particulates that are disposed in a propped fracture of the subterranean formation. Formation of a cured resin coating upon gravel particulates in a gravel pack may also take place similarly. The formation of a cured resin coating upon the particulates advantageously affixes the particulates to one another and limits their ability to flow back from the subterranean formation via the wellbore during production. In addition, the cured resin coating may hold the particulates substantially in place within the subterranean formation, such as within propped fractures in the case of proppant particulates.

In other various embodiments, the methods for forming a cured resin coating may comprise an on-the-fly coating process for particulates. More specifically, in some embodiments, forming a coating of the curable resin may take place on-the-fly on proppant particulates or gravel particulates as they are being introduced into the wellbore. Once within the wellbore, the curable resin may undergo curing to form a cured resin coating. A consolidated proppant pack or gravel pack may be formed within the wellbore once curing of the resin takes place, thereby providing the advantages discussed above. On-the-fly coating techniques can be particularly advantageous due to the simplicity through which they may form a resin coating.

Proppant particulates suitable for use in the various embodiments of the present disclosure are not believed to be particularly limited. Suitable proppant particulates include any material that can be satisfactorily coated with the curable resin and a carbon nanomaterial under a particular set of conditions. Illustrative proppant particulates that may be used in conjunction with the embodiments described herein include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. The mean particulate size of the proppant particulates generally may range from about 2 mesh to about 400 mesh on the U.S. Sieve Series, although other sizes or mixtures of sizes may be desirable in certain embodiments. The proppant particulates may be substantially spherical materials, fibrous materials, polygonal materials (such as cubic materials), irregular shapes, and any combination thereof. Gravel particulates are similarly not believed to be particularly limited.

In more specific embodiments, on-the-fly coating methods for particulates using a graphene-containing resin are described herein. In some embodiments, the methods may comprise: introducing a treatment fluid comprising a curable resin and a graphene material into a wellbore penetrating a subterranean formation; forming a coating of the curable resin on a surface of particulates in the wellbore, the coating being formed on-the-fly and the graphene material being dispersed throughout the coating; and curing the curable resin to form a cured resin coating.

In various embodiments, a loading of the graphene material in the cured resin coating may range between about 0.01 wt. % and about 5 wt. %. In more specific embodiments, a loading of the graphene material in the cured resin coating may range between about 0.1 wt. % and about 1 wt. %. At these loading ranges, a concentration of the graphene material in a treatment fluid generally does not substantially impact the treatment fluid's ability to perform its intended function.

Graphene materials that are suitable for practicing the embodiments described herein are not believed to be particularly limited and may be chosen based upon the needs of a particular application. Suitable graphene materials may include, but are not limited to, as-produced graphene, single-layer graphene, multi-layer graphene, graphene platelets, graphene sheets, graphene nanoribbons, graphene oxide, reduced graphene, functionalized graphene, any hybrid variant thereof, and any combination thereof. Unless otherwise indicated, the generic term "graphene" will be used synonymously herein with the term "graphene materials" to refer to any of these specific forms or types of graphene. As used herein, term "as-produced graphene" will refer to graphene that it directly obtained from a graphene production process, without further modification of any intrinsic functional groups present in the graphene. As used herein, the term "single-layer graphene" will refer to a single sheet of $sp^2$ carbon atoms that is one carbon atom layer in thickness. As used herein, the term "multi-layer graphene," which also may be referred to as "few-layer graphene," will refer to more than one and less than about 20 stacked sheets of $sp^2$ carbon atoms. As used herein, the term "graphene platelets" will refer to graphene particles having a cross-sectional width of about 10 nm or less. Graphene sheets, in contrast, have a larger cross-sectional width, up to about 1 micron in size. Even larger graphene sheets are possible in some embodiments. As used herein, the term "graphene nanoribbons" will refer to one or more stacked $sp^2$ carbon sheets that have an aspect ratio of at least about 5. As used herein, the term "reduced graphene" will refer to a graphene that has had at least a portion of its intrinsic functional groups modified or removed by a reduction process. As used herein, the term "functionalized graphene" will refer to a graphene that has had additional functional groups introduced thereto or that has had its intrinsic functional groups undergo further modification. As used herein, the term "graphene oxide" will refer to a $sp^2$ carbon sheets produced by oxidative exfoliation of graphite. Further description of these graphene materials and illustrative techniques for their production is provided hereinbelow.

Hybrid variants of the foregoing graphene materials are also possible. As non-limiting examples, hybrid variants can include the following: multi-layer graphene that has been reduced, multi-layer graphene that has been functionalized, multi-layer graphene nanoribbons, single-layer graphene nanoribbons, graphene nanoribbons that have been reduced, and graphene nanoribbons that have been functionalized.

Some illustrative processes for producing large-area graphene sheets involve chemical vapor deposition or plasma-enhanced chemical vapor deposition of a carbonaceous precursor onto a metal substrate, such as a copper substrate. Liberation of the graphene from the metal substrate can produce single- or multi-layer graphene sheets.

Oxidative exfoliation of graphite can produce oxidized graphene (i.e., graphene oxide), often in the form of graphene platelets. A common oxidative exfoliation process for graphite is Hummers method, which involves reaction of graphite with a mixture of sodium nitrite, potassium permanganate, and sulfuric acid. Related oxidative exfoliation techniques are also possible.

Graphene nanoribbons can be produced by oxidative opening of carbon nanotubes along their longitudinal axis. Illustrative conditions to affect longitudinal opening of carbon nanotubes involve a reaction of carbon nanotubes with a mixture of potassium permanganate and sulfuric acid. Single- or multi-layer graphene nanoribbons can be produced by this technique, starting from single-walled carbon nanotubes or multi-walled carbon nanotubes, respectively. The graphene sheets produced in these oxidative processes bear extensive oxygenated functional groups and may be reduced, as described hereinafter.

Reduction of the intrinsic functional groups in as-produced graphene, graphene oxide or graphene nanoribbons may take place to decrease the extent of oxygenation in the graphene. Intrinsic oxygenated functional groups in graphene may be removed by the reduction process, or their oxidation state may be decreased (e.g., conversion of a carboxylic acid to an alcohol functional group). Illustrative processes for producing a reduced graphene include, for example, thermal deoxygenation, chemical reduction, or any combination thereof. Chemical reduction of graphene can be accomplished, for example, by reacting a graphene with hydrogen gas or hydrazine. Thermal deoxygenation can be accomplished, for example, by heating a graphene at a temperature that is sufficient to remove at least some of its oxygenated functionalities, such as at a temperature of about 1000° C. or more.

Functionalized graphene can be produced through the introduction of additional functional groups to the graphene via a chemical reaction and/or through the modification of the intrinsic functional groups in the graphene. Various functionalities may be introduced to a graphene through its reaction with an electrophile. In a non-limiting example, a diazonium salt may be reacted with graphene to introduce a carbon-containing moiety, optionally containing one or more additional functional groups, to the graphene. Other functionalization strategies for graphene can be envisioned by one having ordinary skill in the art. For example, a number of reactions used for functionalizing carbon nanotubes may be extended to the functionalization of graphene by one having ordinary skill in the art.

In some embodiments, intrinsic functional groups in the graphene may be modified to produce a functionalized graphene. Intrinsic functional groups that may be present in the graphene include, for example, carboxylic acids, alcohols, ketones, epoxides and any combination thereof. Carboxylic acids can be reacted to form esters or amides, or they can be reduced to form alcohols. Alcohol functional groups can be reacted to form ethers or esters or transformed into other reactive functional groups, in which case they may be reacted with entities such as amines and mercaptans, for example. Carbonyl groups and epoxides can be reacted with nucleophiles to form addition products. It is to be recognized that the foregoing description should not be considered to exhaustively encompass the scope of functionalized graphene. Other reactions for either intrinsic or subsequently introduced functional groups in graphene can be envisioned by one having ordinary skill in the art and selected based upon the disclosure provided herein.

In some embodiments, functional groups in the graphene may be used to further promote compatibility between the graphene and the cured resin coating. In some embodiments, the functional groups may simply promote dispersibility of the graphene in the resin coating or in a treatment fluid used to deposit the coating of uncured resin. For example, in some embodiments, the graphene may be non-covalently bonded via a van der Waals interaction to the cured resin coating. In other embodiments, the graphene may be covalently bonded to the cured resin coating. The covalent bond may be established between the graphene and a component of the curable resin or directly to the cured resin coating following curing. Any type of covalent attachment can be used, provided that it does not interfere with curing of the resin coating. Covalent bonding of the graphene to the cured resin coating may take place through any of the graphene functionalization techniques discussed above, including through reacting intrinsic functional groups in the graphene with a component of the curable resin.

The identity of the curable resin used in practicing the embodiments described herein is not considered to be particularly limited. As used herein, the term "resin" will refer to any of numerous physically similar polymerized synthetics or chemically modified natural resins, including thermoplastic materials and thermosetting materials. Resins that may be suitable for use in the embodiments of the present disclosure may include substantially all resins known and used in the art.

One type of resin suitable for use in the embodiments of the present disclosure is a two-component epoxy-based resin comprising a liquid hardenable resin component and a liquid hardening agent component. The liquid hardenable resin component comprises a hardenable resin and an optional solvent. The solvent may be added to the resin to reduce its viscosity for ease of handling, mixing and transferring. An alternate way to reduce the viscosity of the hardenable resin is to heat it. The second component is the liquid hardening agent component, which comprises a hardening agent, an optional silane coupling agent, a surfactant, an optional hydrolyzable ester, and an optional liquid carrier fluid.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, the like and any combination thereof. In some embodiments, the hardenable resin may comprise a urethane resin.

The hardenable resin may be included in the liquid hardenable resin component in an amount ranging between about 5% to about 100%, by weight of the liquid hardenable resin component. Amounts less than about 5% by weight are also possible. It is within the ability of one having ordinary skill in the art and the benefit of this disclosure to determine how much of the liquid hardenable resin component may be needed to achieve desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include, for example, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, D-limonene, fatty acid methyl esters, butylglycidyl ether, and any combination thereof. Other suitable solvents may include aqueous miscible solvents such as methanol, isopropanol, butanol, and glycol ether solvents, and combinations thereof. Suitable glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Vegetable oils, such as soybean oil, for example, may also comprise the solvent used in conjunction with the resin. Selection of an appropriate solvent may be dependent on the resin composition chosen, which is within the ability of one having ordinary skill in the art and the benefit of this disclosure.

Use of a solvent in the liquid hardenable resin component is optional but may be desirable to reduce the viscosity of the hardenable resin component for ease of handling, mixing, and transferring. It is within the ability of one having ordinary skill in the art and the benefit of this disclosure to determine if and how much solvent is needed to achieve a suitable viscosity. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

Examples of hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; and 2-ethyl-4-methyl imidazole; and combinations thereof. The chosen hardening agent often effects the range of temperatures over which a hardenable resin is able to cure. By way of example, and not limitation, in subterranean formations having a temperature of about 60° F. to about 250° F., amines and cyclo-aliphatic amines such as piperidine, triethylamine, tris(dimethylaminomethyl) phenol, and dimethylaminomethyl)phenol may be preferred. In subterranean formations having higher temperatures, 4,4'-diaminodiphenyl sulfone may be a suitable hardening agent.

A hardening agent may be included in the liquid hardening agent component in an amount sufficient to at least partially harden the resin composition. In some embodiments, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the binder material may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, the liquid hardenable resin component and the liquid hardening agent component may both be emulsified in water.

The optional silane coupling agent may be used, among other things, to act as a mediator to help bond the resin to a surface. Examples of suitable silane coupling agents include, but are not limited to, N-2-(aminoethyl)-3-aminopropyltrimethoxysilane, 3-glycidoxypropyltrimethoxysilane, and any combination thereof. The silane coupling agent may be included in the resin component or the liquid hardening agent component. In some embodiments, the silane coupling agent used may be included in the liquid hardening agent component in a range of about 0.1% to about 3% by weight of the liquid hardening agent component.

Any surfactant compatible with the hardening agent and capable of facilitating the coating of the resin may be used in the liquid hardening agent component. Suitable surfactants include, but are not limited to, alkyl phosphonate surfactants (e.g., C12-C22 alkyl phosphonate surfactants), an ethoxylated nonyl phenol phosphate ester, one or more cationic surfactants, and one or more nonionic surfactants. Combinations of one or more cationic and nonionic surfactants also may be suitable. The surfactant or surfactants may be included in the liquid hardening agent component in an amount ranging between about 1% to about 10% by weight of the liquid hardening agent component.

Examples of hydrolyzable esters that may be used in the liquid hardening agent component include, but are not limited to, a combination of dimethylglutarate, dimethyladipate, and dimethylsuccinate; dimethylthiolate; methyl salicylate; dimethyl salicylate; dimethylsuccinate; and any combination thereof. When used, a hydrolyzable ester may be included in the liquid hardening agent component in an amount ranging between about 0.1% to about 3% by weight of the liquid hardening agent component. In some embodiments, a hydrolyzable ester may be included in the liquid hardening agent component in an amount ranging between about 1% to about 2.5% by weight of the liquid hardening agent component.

Use of a diluent or liquid carrier fluid in the liquid hardening agent component is optional and may be used to reduce the viscosity of the liquid hardening agent component for ease of handling, mixing, and transferring. Any suitable carrier fluid that is compatible with the liquid hardening agent component and achieves the desired viscosity effect may be suitable for use in the embodiments of the present disclosure. Some suitable liquid carrier fluids include solvents as, for example, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, D-limonene, fatty acid methyl esters, and any combination thereof. Other suitable liquid carrier fluids include aqueous miscible solvents such as, for example, methanol, isopropanol, butanol, glycol ether solvents, and any combination thereof. Suitable glycol ether liquid carrier fluids include, but are not limited to, diethylene glycol methyl ether, dipropylene glycol methyl ether, 2-butoxy ethanol, ethers of a C2-C6 dihydric alkanol having at least one C1-C6 alkyl group, mono ethers of dihydric alkanols, methoxypropanol, butoxyethanol, and hexoxyethanol, and isomers thereof. Combinations of these may be suitable as well. Selection of an appropriate liquid carrier fluid may be dependent upon the chosen resin composition, for example.

Other resins suitable for use in the embodiments of the present disclosure are furan-based resins. Suitable furan-based resins include, but are not limited to, furfuryl alcohol resins, furfural resins, combinations of furfuryl alcohol resins and aldehydes, and a combination of furan resins and phenolic resins. A furan-based resin may be combined with a solvent to control viscosity, if desired. Suitable solvents for use with a furan-based resin include, but are not limited to, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. In some embodiments, the furan-based resins may be capable of enduring temperatures well in excess of 350° F. without degrading. In some embodiments, the furan-based resins suitable for use in the embodiments of the present disclosure are capable of enduring temperatures up to about 700° F. without degrading.

Optionally, the furan-based resins may further comprise a curing agent to facilitate or accelerate curing of the furan-based resin at lower temperatures. Examples of suitable curing agents may include organic or inorganic acids, such as, for example, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid, and any combination thereof. In embodiments where a curing agent is not used, the furan-based resin may cure autocatalytically.

Still other resins suitable for use in the embodiments of the present disclosure are phenolic-based resins. Suitable phenolic-based resins include, but are not limited to, terpolymers of phenol, phenolic formaldehyde resins, and a combination of phenolic and furan resins. A phenolic-based resin may be combined with a solvent to control viscosity, if desired. Suitable solvents include, but are not limited to, butyl acetate, butyl lactate, furfuryl acetate, and 2-butoxyethanol.

Yet another resin material suitable for use in the embodiments of the present disclosure is a phenol/phenol formaldehyde/furfuryl alcohol resin comprising about 5% to about 30% phenol, about 40% to about 70% phenol formaldehyde, about 10% to about 40% furfuryl alcohol, about 0.1% to about 3% of a silane coupling agent, and about 1% to about 15% of a surfactant. Suitable silane coupling agents include, but are not limited to, N-2-(aminoethyl)-3-aminopropyltrimethoxysilane, 3-glycidoxypropyltrimethoxysilane, and any combination thereof. Suitable surfactants include, but are not limited to, an ethoxylated nonylphenol phosphate ester, combinations of one or more cationic surfactants, and one or more nonionic surfactants and an alkyl phosphonate surfactant.

Plant oil-based resin systems may also be used as the resin in some embodiments of the present disclosure. Suitable plant-oil based resins may include, for example, a vegetable oil, an epoxidized vegetable oil, an epoxidized monoglyceride of vegetable oil, a fruit oil, or any combination thereof. Particularly suitable plant oils may include, for example, linseed oil, soybean oil, palm oil, coconut oil, argemone oil, pongamia oil, jatropha oil, laurel oil, neem oil, cottonseed oil, vernonia oil, Annona squamosa oil, Catunaregam nilotica oil, rubber seed oil, crabe oil, Jatropha curcas oil, rapeseed oil, canola oil, sunflower oil, safflower oil, maize oil, sandalwood oil, castor oil, jojoba oil, peanut oil, cashew oil, sesame oil, olive oil, candle nut oil, and any combination thereof.

In some embodiments, filler materials may be present in the curable resin of the present disclosure. Suitable filler materials may include any particle that does not adversely affect curing of the resin coating, for example. Examples of suitable filler materials include silica, glass, clay, alumina, fumed silica, carbon black, graphite, mica, meta-silicate, calcium silicate, calcinite, kaolinite, talc, zirconia, titanium dioxide, fly ash, boron, and any combination thereof. In some embodiments, the filler material may range in size from about 0.01 μm to about 100 μm. The filler material may be included in the resin in an amount ranging between about 0.1% to about 70% by weight, or between about 0.5% to about 40% by weight, or between about 1% to about 10% by weight. Suitable filler materials may be of any suitable shape, such as particulate or fibrous.

In addition to the carbon nanomaterial and the curable resin, the treatment fluids of the present disclosure may contain various other additives or any combination thereof. Any of these additives may be present in a coating of the curable resin formed from the treatment fluid. Further additives that may be present include, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. One of ordinary skill in the art will be able to choose particular additives for inclusion in a given treatment fluid in order to perform a given downhole operation.

In further embodiments, methods of the present disclosure may comprise spectroscopically assaying the graphene in order to probe conditions within the wellbore, particularly to determine the integrity of the cured resin coating. Although the graphene may be spectroscopically assayed in the wellbore while it is still within the cured resin coating, it may be more advantageous and simpler to spectroscopically assay the graphene once it has been removed from the subterranean environment. Specifically, a produced fluid may be spectroscopically assayed to analyze for the graphene or any derivative thereof in order to determine if the graphene is no longer held downhole in the cured resin coating and/or has undergone a chemical transformation from the time it was introduced into the wellbore. As indicated above, a lack of graphene in the produced fluid may be indicative of an intact cured resin coating in which the graphene is retained. The presence of graphene or a graphene derivative in a produced fluid, in contrast, provides a strong indication that degradation of a cured resin coating has occurred or is occurring, thereby resulting in release of the graphene in free form or encased in resin pieces. The original graphene may become chemically transformed to form a graphene derivative during degradation of the cured resin coating, and determining that a chemical transformation has occurred may be of value to a well operator. For example, the occurrence of a chemical transformation may be indicative of incompatible chemical conditions in the subterranean environment, in which case it may be desirable to make use of a different graphene material and/or a different curable resin.

Accordingly, in some embodiments, the methods of the present disclosure may further comprise producing a fluid from the subterranean formation, and spectroscopically assaying the produced fluid for the carbon nanomaterial, such as graphene, or any derivative thereof. Any suitable spectroscopic technique may be used for spectroscopically assaying the produced fluid for the carbon nanomaterial. Suitable spectroscopic techniques may include, for example, infrared, ultraviolet, Raman and fluorescence spectroscopic methods. Fluorescence spectroscopy and Raman spectroscopy may be particularly sensitive for assaying the $sp^2$ carbon framework of graphene and other carbon nanomaterials. Infrared and ultraviolet spectroscopies may be particularly well adapted for assaying functional groups that may be present on the graphene. Combinations of these spectroscopic techniques may also be used to obtain a complete picture of the produced graphene's condition.

In further embodiments, the methods may additionally comprise correlating an amount of the carbon nanomaterial or any derivative thereof in the produced fluid to a breakdown or degradation of the cured resin coating. For example, in some embodiments, the amount of graphene or graphene derivative in the produced fluid can be indicative of the extent of breakdown of the cured resin coating. That is, the higher the amount of graphene that is detected, the greater the extent of coating degradation that has occurred. In some embodiments, the detection of a pre-determined amount of graphene in the produced fluid may serve as a trigger to perform a workover or remedial treatment to address breakdown or partial breakdown of the cured resin coating. One of ordinary skill in the art will be able to determine an acceptable level of graphene in the produced fluid during which well operations may continue. Thus, the methods of the present disclosure may allow well operations to be maintained until a threshold breakdown of cured resin coating has occurred to release the graphene, thereby increasing efficiency and decreasing operating costs. In other embodiments, detection of any amount of graphene or graphene derivative in the produced fluid may serve as a signal that the cured resin coating has failed or is about to fail and may serve as a trigger to perform a workover or remedial operation.

In other various embodiments, systems configured for delivering a treatment fluid of the present disclosure to a downhole location are described herein. In various embodiments, the systems can comprise a treatment fluid comprising a curable resin and a carbon nanomaterial; and a pump fluidly coupled to a tubular for placing the treatment fluid.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the curable resin and carbon nanomaterial are formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from the subterranean formation.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for forming a cured resin coating. The methods comprise: introducing a treatment fluid comprising a curable resin and a carbon nanomaterial into a wellbore penetrating a subterranean formation; forming a coating of the curable resin on a surface in the wellbore, the carbon nanomaterial being dispersed throughout the coating; and curing the curable resin to form a cured resin coating.

B. Methods for forming a cured resin coating on-the-fly. The methods comprise: introducing a treatment fluid comprising a curable resin and a graphene material into a wellbore penetrating a subterranean formation; forming a coating of the curable resin on a surface of particulates in the wellbore, the coating being formed on-the-fly and the graphene material being dispersed throughout the coating; and curing the curable resin to form a cured resin coating.

C. Systems for forming a cured resin coating. The systems comprise: a treatment fluid comprising a curable resin and a carbon nanomaterial; and a pump fluidly coupled to a tubular for placing the treatment fluid.

Each of embodiments A-C may have one or more of the following additional elements in any combination:

Element 1: wherein the carbon nanomaterial comprises a graphene material.

Element 2: wherein the graphene material comprises a material selected from the group consisting of as-produced graphene, single-layer graphene, multi-layer graphene, graphene platelets, graphene sheets, graphene nanoribbons, graphene oxide, reduced graphene, functionalized graphene, any hybrid variant thereof, and any combination thereof.

Element 3: wherein the graphene material is covalently bonded to the cured resin coating.

Element 4: wherein the treatment fluid is introduced into the wellbore during a fracturing operation, a gravel packing operation, a frac-packing operation, a consolidation operation, or a sand control operation.

Element 5: wherein forming a coating of the curable resin takes place on-the-fly on proppant particulates or gravel particulates.

Element 6: wherein forming a coating of the curable resin takes place on unconsolidated sand within the subterranean formation.

Element 7: wherein forming a coating of the curable resin takes place on proppant particulates that are disposed in a propped fracture of the subterranean formation.

Element 8: wherein forming a coating of the curable resin takes place on a fracture face present in the subterranean formation.

Element 9: wherein forming a coating of the curable resin takes place on formation fines within the subterranean formation.

Element 10: wherein the method further comprises: producing a fluid from the subterranean formation; and spectroscopically assaying the produced fluid for the carbon nanomaterial or any derivative thereof.

Element 11: wherein the method further comprises: correlating an amount of the carbon nanomaterial or any derivative thereof in the produced fluid to a breakdown of the cured resin coating.

Element 12: wherein a loading of the graphene material in the cured resin coating ranges between about 0.01 wt. % and about 5 wt.

Element 13: wherein the method further comprises: producing a fluid from the subterranean formation; and spectroscopically assaying the produced fluid for the graphene material or any derivative thereof.

Element 14: wherein the method further comprises: correlating an amount of the graphene material or any derivative thereof in the produced fluid to a breakdown of the cured resin coating.

By way of non-limiting example, exemplary combinations applicable to A-C include:

The method of A in combination with elements 1 and 4.
The method of A in combination with elements 1 and 2.
The method of A in combination with elements 1, 4 and 5.
The method of A in combination with elements 1, 4 and 6.
The method of A in combination with elements 1, 4 and 7.
The method of A in combination with elements 1, 4 and 8.
The method of A in combination with elements 1, 4 and 9.
The method of A in combination with elements 4 and 10.
The method of A in combination with elements 4, 10 and 11.
The method of A in combination with elements 1, 4 and 10.
The method of B in combination with elements 2 and 3.
The method of B in combination with elements 2 and 4.
The method of B in combination with elements 4 and 5.
The method of B in combination with elements 4 and 6.
The method of B in combination with elements 4 and 7.
The method of B in combination with elements 4 and 8.
The method of B in combination with elements 4 and 9.
The method of B in combination with elements 2 and 10.
The method of B in combination with elements 2, 10 and 11.
The system of C in combination with elements 1 and 2.

To facilitate a better understanding of the embodiments of the present disclosure, the following examples of preferred or representative embodiments are given. In no way should the following examples be read to limit, or to define, the scope of the disclosure.

EXAMPLES

Example 1

Resin Strengthening with Graphene Platelets

Graphene platelets were combined with various ratios of EXPEDITE 350A resin (Halliburton Energy Services) and EXPEDITE 350 B resin hardener (Halliburton Energy Services) or ECOPDXY resin hardener (Ecopoxy Systems, Canada). The combined mixture was then dry coated onto natural 20/40 sand from Saudi Arabia at a 3% overall resin loading. The samples were then cured at various temperatures and for various lengths of time. Curing took place in an autoclave at 3000 psi in the presence of a linear gel as a mimic of a fracturing fluid. Control samples were prepared in a similar manner with the graphene platelets omitted. The unconfined compression strength (UCS) values of the samples were then measured. Table 1 summarizes the resin composition, curing conditions and the UCS values for each sample.

TABLE 1

| Sample | Resin and Hardener | Resin/Hardener Ratio | Graphene (wt. %) | Curing Time (hr) | Curing Temperature (° F.) | UCS (psi) |
|---|---|---|---|---|---|---|
| 1 | EXPEDITE 350A EXPEDITE 350B | 1:1 | 0 | 24 | 290 | 1189 |
| 2 | EXPEDITE 350A EXPEDITE 350B | 1:1 | 0.075 | 24 | 290 | 1698 |
| 3 | EXPEDITE 350A EXPEDITE 350B | 1:1 | 0 | 48 | 290 | 1213 |
| 4 | EXPEDITE 350A EXPEDITE 350B | 1:1 | 0.075 | 48 | 290 | 1642 |
| 5 | EXPEDITE 350A ECOPOXY | 7:3 | 0 | 48 | 180 | 132 |
| 6 | EXPEDITE 350A ECOPOXY | 7:3 | 0.075 | 48 | 180 | 280 |

As can be seen from Table 1, inclusion of the graphene in the resin composition increased the UCS value in all cases. Even though the UCS values were lower in resin samples 5 and 6, inclusion of the graphene still resulted in an increase in the UCS value of sample 6 compared to sample 5.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a treatment fluid comprising a curable resin and a carbon nanomaterial into a wellbore penetrating a subterranean formation, wherein the carbon nanomaterial has a size of about 100 nm or less and the carbon nanomaterial comprises a graphene selected from the group consisting of as-produced graphene, single-layer graphene, multi-layer graphene, graphene platelets, graphene sheets, graphene nanoribbons, graphene oxide, reduced graphene, functionalized graphene, any hybrid variant thereof, and any combination thereof;
   forming a coating of the curable resin on a surface in the wellbore, the carbon nanomaterial being dispersed throughout the coating; and
   curing the curable resin to form a cured resin coating comprising about 0.01 wt. % to about 5 wt. % of the carbon nanomaterial;
   producing a fluid from the subterranean formation: and
   fluorescence spectroscopically assaying the produced fluid for the carbon nanomaterial or any derivative thereof:
   wherein the carbon nanomaterial having a size of about 100 nm or less enhances the mechanical strength and thermal conductivity of the resin coating thereby decreasing susceptibility of the resin coating to undergo crack formation and propagation.

2. The method of claim 1, wherein the graphene material is covalently bonded to the cured resin coating.

3. The method of claim 1, wherein the treatment fluid is introduced into the wellbore during a fracturing operation, a gravel packing operation, a frac-packing operation, a consolidation operation, or a sand control operation.

4. The method of claim 3, wherein forming a coating of the curable resin takes place on-the-fly on proppant particulates or gravel particulates.

5. The method of claim 3, wherein forming a coating of the curable resin takes place on unconsolidated sand within the subterranean formation.

6. The method of claim 3, wherein forming a coating of the curable resin takes place on proppant particulates that are disposed in a propped fracture of the subterranean formation.

7. The method of claim 3, wherein forming a coating of the curable resin takes place on a fracture face present in the subterranean formation.

8. The method of claim 1, wherein forming a coating of the curable resin takes place on formation fines within the subterranean formation.

9. The method of claim 1, further comprising:
   correlating an amount of the carbon nanomaterial or any derivative thereof in the produced fluid to a breakdown of the cured resin coating.

10. A method comprising:
    introducing a treatment fluid comprising a curable resin and a graphene material into a wellbore penetrating a subterranean formation,
    wherein the graphene material has a size of about 100 nm or less and the graphene material comprises a material selected from the group consisting of as-produced graphene, single-layer graphene, multi-layer graphene, graphene platelets, graphene sheets, graphene nanoribbons, graphene oxide, reduced graphene, functionalized graphene, any hybrid variant thereof, and any combination thereof;
    forming a coating of the curable resin on a surface of particulates in the wellbore, the coating being formed on-the-fly and the graphene material being dispersed throughout the coating; and
    curing the curable resin to form a cured resin coating comprising about 0.01 wt. % to about 5 wt. % of the graphene material;
    producing a fluid from the subterranean formation; and
    fluorescence spectroscopically assaying the produced fluid for the carbon nanomaterial or any derivative thereof;
    wherein the graphene material having a size of about 100 nm or less enhances the mechanical strength and thermal conductivity of the resin coating thereby decreasing susceptibility of the resin coating to undergo crack formation and propagation.

11. The method of claim 10, wherein the graphene material is covalently bonded to the cured resin coating.

12. The method of claim 10, wherein the treatment fluid is introduced into the wellbore during a fracturing operation, a gravel packing operation, a frac-packing operation, a consolidation operation, or a sand control operation.

13. The method of claim 12, wherein forming a coating of the curable resin takes place on proppant particulates or gravel particulates.

14. The method of claim 12, wherein forming a coating of the curable resin takes place on unconsolidated sand within the subterranean formation.

15. The method of claim 12, wherein forming a coating of the curable resin takes place on proppant particulates that are disposed in a propped fracture of the subterranean formation.

16. The method of claim 10, wherein forming a coating of the curable resin takes place on formation fines present in the subterranean formation.

17. The method of claim 10, wherein a loading of the graphene material in the cured resin coating ranges between about 0.01 wt. % and about 5 wt. %.

18. The method of claim 10, further comprising:
  correlating an amount of the graphene material or any derivative thereof in the produced fluid to a breakdown of the cured resin coating.

* * * * *